United States Patent [19]

Harvey

[11] Patent Number: 5,764,027

[45] Date of Patent: Jun. 9, 1998

[54] METHOD AND APPARATUS FOR BATTERY CHARGE BALANCING

[75] Inventor: Thomas Patrick Harvey, Novi, Mich.

[73] Assignee: Ford Global Technologies, Inc., Dearborn, Mich.

[21] Appl. No.: 669,260

[22] Filed: Jun. 21, 1996

[51] Int. Cl.⁶ .................................................. H01M 10/44
[52] U.S. Cl. ................... 320/6; 320/17; 320/15; 320/13
[58] Field of Search .................. 320/17, 18, 15, 320/5–6, 13, 14, 35, 39, 48, 43

[56] References Cited

U.S. PATENT DOCUMENTS

| | | | |
|---|---|---|---|
| 3,980,940 | 9/1976 | Mabuchi et al. | 320/13 X |
| 3,997,830 | 12/1976 | Newell et al. | 320/5 |
| 4,238,721 | 12/1980 | DeLuca et al. | 320/18 |
| 4,614,905 | 9/1986 | Petersson et al. | 320/18 |
| 4,616,170 | 10/1986 | Urstoger | 320/18 X |
| 5,063,340 | 11/1991 | Kalenowsky | 320/17 X |
| 5,153,496 | 10/1992 | LaForge | 320/17 |
| 5,283,512 | 2/1994 | Stadnick et al. | 320/18 |
| 5,387,857 | 2/1995 | Honda et al. | 320/18 |
| 5,488,282 | 1/1996 | Hayden et al. | 320/17 X |
| 5,498,950 | 3/1996 | Ouwerkerk | 320/18 |
| 5,504,415 | 4/1996 | Podrahansky et al. | 320/18 |
| 5,565,759 | 10/1996 | Dunstan | 320/48 |
| 5,578,914 | 11/1996 | Morita | 320/18 |

Primary Examiner—Peter S. Wong
Assistant Examiner—K. Shin
Attorney, Agent, or Firm—Mark S. Sparschu

[57] ABSTRACT

In the embodiment of the present invention, a method for balancing charges of a plurality of batteries coupled in series includes determining actual or estimated rates of self-discharge of the batteries and individually shunting across one or more of the batteries to cause shunt currents which at least partially compensate for differences in the rates of self-discharge between batteries. In a second embodiment of the present invention, a method for balancing charges of a plurality of batteries coupled in series comprises measuring temperatures of the batteries and individually shunting across one or more of the batteries to cause shunt currents from those batteries which are functions of the temperatures of those batteries. A third embodiment of the present invention provides a method for balancing charges of a plurality of batteries coupled in series, the batteries furnished to store and provide energy for use in propelling an electrically-propelled vehicle. This method includes determining actual or relative states of charge of the batteries when the batteries are providing energy for propelling the electrically-propelled vehicle. The method also comprises individually shunting across one or more of the batteries when the batteries are providing energy for propelling the electrically-propelled vehicle, to generate shunt currents from those batteries.

12 Claims, 2 Drawing Sheets

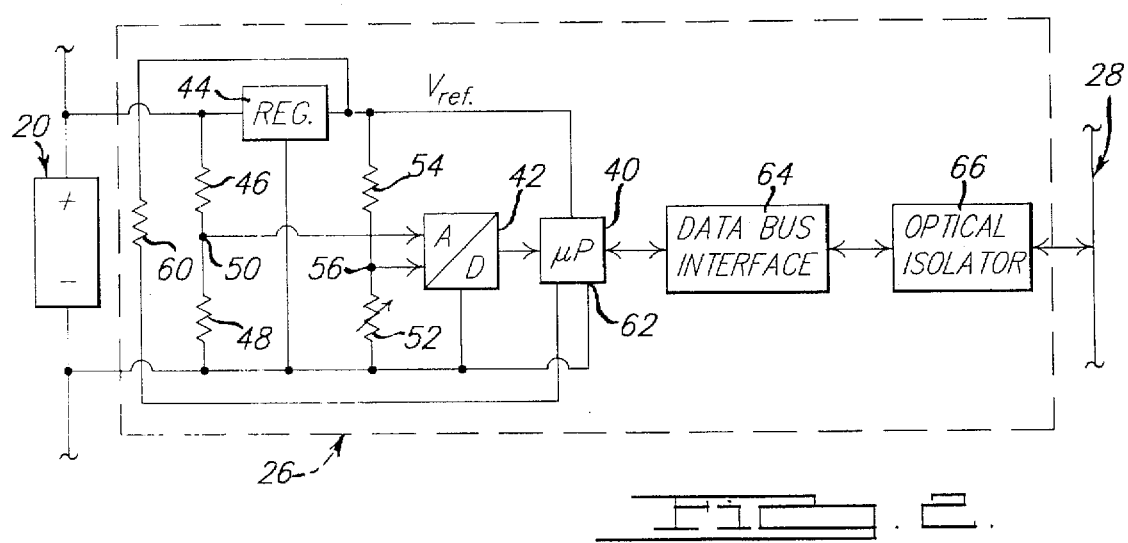
FIG. 2.
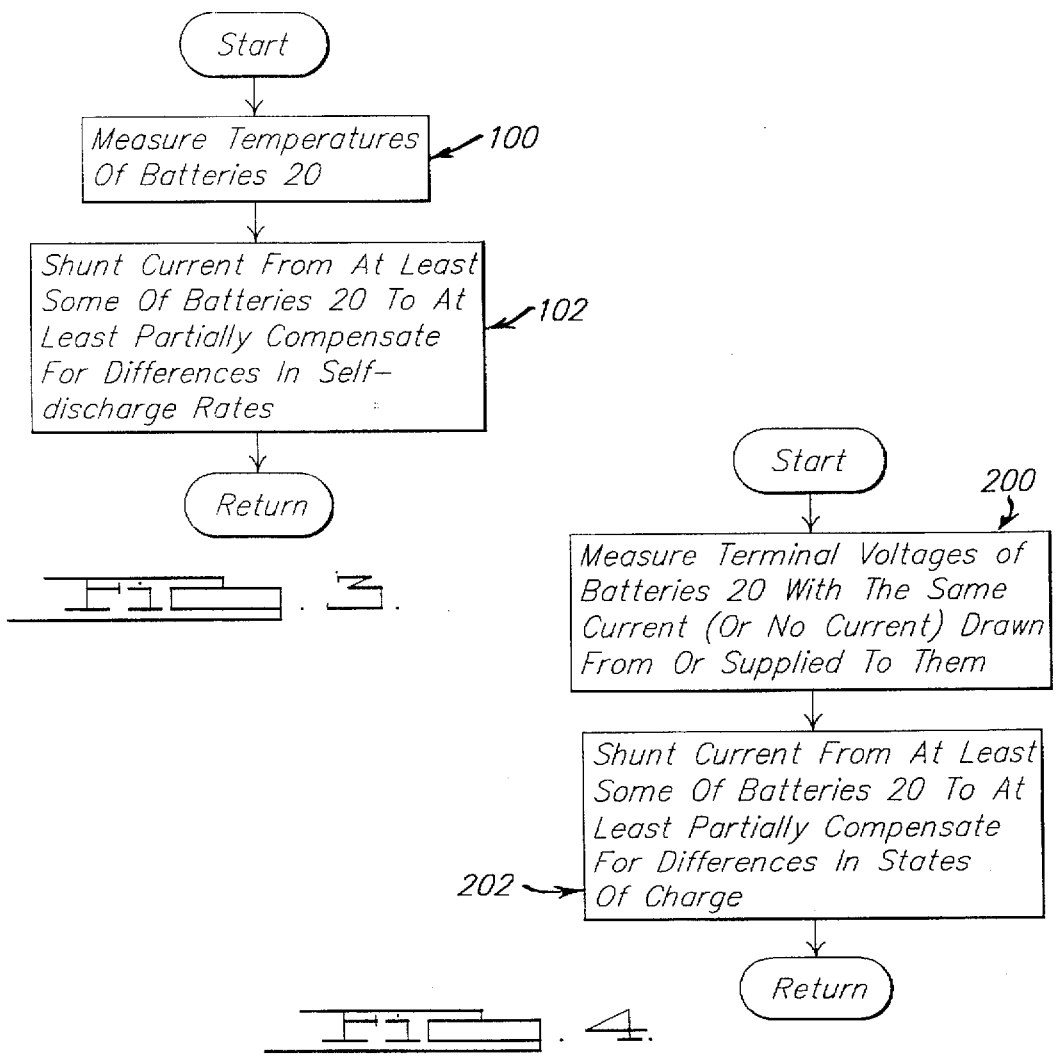
FIG. 3.
FIG. 4.

METHOD AND APPARATUS FOR BATTERY CHARGE BALANCING

BACKGROUND OF THE INVENTION

1. Field of the Invention

The present invention relates to battery energy management.

2. Description of the Related Art

In applications where a plurality of batteries are used as a means of energy storage, imbalances in the states of charge of the batteries can result from a number of causes. For example, batteries can have a "self-discharge" which is a function of the battery temperature, with warmer batteries typically exhibiting greater self-discharge rates than cooler batteries. As a result, warmer batteries will over time exhibit a lower state of charge than cooler batteries. Additional factors, such as manufacturing variation, age of the batteries and others can also have an effect on the self-discharge rate of batteries.

Imbalances in the states of charge of batteries are disadvantageous. Where a battery pack comprising a plurality of series connected batteries is used, as is typical for example in an electric vehicle, the energy delivery capability of the battery pack is limited by the battery with the lowest state of charge. When that battery is exhausted, the practical capability of the battery pack to continue delivering energy is exhausted. This is true although all of the other batteries in the battery pack may not yet be exhausted. Thus, imbalances in states of charge of batteries impairs the ability of the batteries to deliver energy to their fullest capability.

A number of methods of balancing states of charge of batteries have been proposed. Several of the methods are employed when the batteries are being charged One such method involves simply charging the batteries with a constant series current until all of the batteries are fully charged. A considerable disadvantage of this method is that the batteries with higher states of charge when the charging process begins will continue receiving current after they are fully charged. This can have a negative effect on battery durability. Also, the heat generated while current is sourced through a fullycharged battery can cause temperature gradients between the batteries in a battery pack. Temperature gradients between batteries are disadvantageous because, for at least the reason discussed above, they promote differing rates of self-discharge between the batteries.

A second charge-balancing method which has been proposed for use while batteries are being charged involves charging the batteries with a relatively high series current until one of the batteries is fully charged. The charging current is then reduced to a trickle current until the remaining batteries are charged. Although this method may help reduce the battery life and temperature gradient problems just discussed, those problems will still be present. Further, reducing the charge current to a trickle can result in a very large charge time for all of the batteries to be fully charged. Particularly in an electric vehicle, short charge times are a very important feature.

A third charge-balancing method which has been proposed for use while batteries are being charged again involves charging the batteries with a relatively high series current until one of the batteries is fully charged. Means are provided to then shunt the charge current around this fully charged battery such that only the other batteries continue to receive charge current. As batteries successively reach full charge, the charge current is shunted around them as well. The charge process is complete when the final battery has reached full charge. U.S. Pat. No. 3,980,940, issued to Mabuchi et al., discloses such a charge-balancing method. Although this method helps address the disadvantages of the first two methods, it has disadvantages of its own. In order for a relatively high charge current to be shunted, the electrical components responsible for shunting the current must have relatively high power ratings. Such components can be expensive and large. Further, if the components are located near the batteries, the heat the components generate can cause the same temperature gradients which the shunting method might otherwise help prevent. On the other hand, if the charging current is reduced once the first battery is fully charged (so the components responsible for shunting currents can be reduced in size and their heat generation can be reduced), increased charge times for the batteries will result. U.S. Pat. Nos. 4,238,721, issued to DeLuca et al.; 4,614,905, issued to Petersson et al.; and 5,283,512, issued to Stadnick et al., disclose charge-balancing methods of this sort.

A further disadvantage of any charge-balancing system which operates only when the batteries are being charged should also be noted. Under some operating regimens, the batteries may often not be left "on charge" until the batteries are all fully charged. In such cases, a charge balancing scheme which operates only when the batteries are being charged cannot fully balance the charges of the batteries.

Another charge-balancing method is disclosed in the '940 patent. In the '940 patent, means are provided to discharge all of the batteries to a common point of deep discharge immediately prior to the beginning of battery charging. Although this method may reduce charge imbalances, it also lengthens the total time required for battery charging. This is so because the battery charging event now also includes the discharging which occurs immediately prior to charging. Also, if the battery pack is connected to the charger for only a short period of time, the battery pack may actually have less energy-delivery capability than before being connected to the charger. This would occur because all of the batteries in the battery pack, including the most-discharged battery, would necessarily be discharged to a very low value (below the normal operating range of the batteries) in order to assure balancing prior to charging. A system wherein the batteries can have less energy-delivery capability after a period of time connected to a charger may prove unsatisfactory in the view of a customer.

Thus, a battery charge-balancing method which substantially reduces or avoids the need to provide 15 charge currents to fully-charged batteries; which can be performed using electrical components of relatively small power rating; which does not have an adverse impact on battery charging times; which does not depend solely upon the vehicle being "on charge" until all batteries are fully charged for charge balancing to be performed; and which does not discharge the batteries immediately before charging will provide advantages over the prior art.

SUMMARY OF THE INVENTION

The present invention provides a method for balancing charges of a plurality of batteries coupled in series. The method comprises determining actual or estimated rates of self-discharge of the batteries and individually shunting across one or more of the batteries to cause shunt currents which at least partially compensate for differences in the rates of self-discharge between batteries.

The present invention further provides a second method for balancing charges of a plurality of batteries coupled in series. The method comprises measuring temperatures of the batteries and individually shunting across one or more of the batteries to cause shunt currents from those batteries which are functions of the temperatures of those batteries.

Additionally, the present invention provides a method for balancing charges of a plurality of batteries coupled in series, the batteries furnished to store and provide energy for use in propelling an electrically-propelled vehicle. The method comprises determining actual or relative states of charge of the batteries when the batteries are providing energy for propelling the electrically-propelled vehicle. The method also comprises individually shunting across one or more of the batteries when the batteries are providing energy for propelling the electrically-propelled vehicle, to generate shunt currents from those batteries.

Charge-balancing methods according to the present invention can work continually to prevent large charge imbalances from developing in battery packs containing a plurality of batteries. Such methods can thus substantially reduce any need to provide charge currents to fully-charged batteries during recharge. Further, the methods can be performed using electrical components of relatively small power rating. The methods also do not have an adverse impact on battery charging times, and further do not depend upon the vehicle being "on charge" until all batteries are fully charged for charge balancing to be performed. The methods also do not discharge the batteries immediately prior to recharging. By working continually to prevent large charge imbalances from occurring, charge-balancing methods according to the present invention can thus provide substantial advantages over the prior art.

BRIEF DESCRIPTION OF THE DRAWINGS

FIG. 2 illustrates internal detail of module control units 26 of FIG. 1.

FIG. 3 is a flowchart illustrating a battery charge balancing method according to one embodiment of the present invention.

FIG. 4 is a flowchart illustrating a battery charge balancing method according to a second embodiment of the present invention.

DETAILED DESCRIPTION OF THE PREFERRED EMBODIMENT

Figure 1:
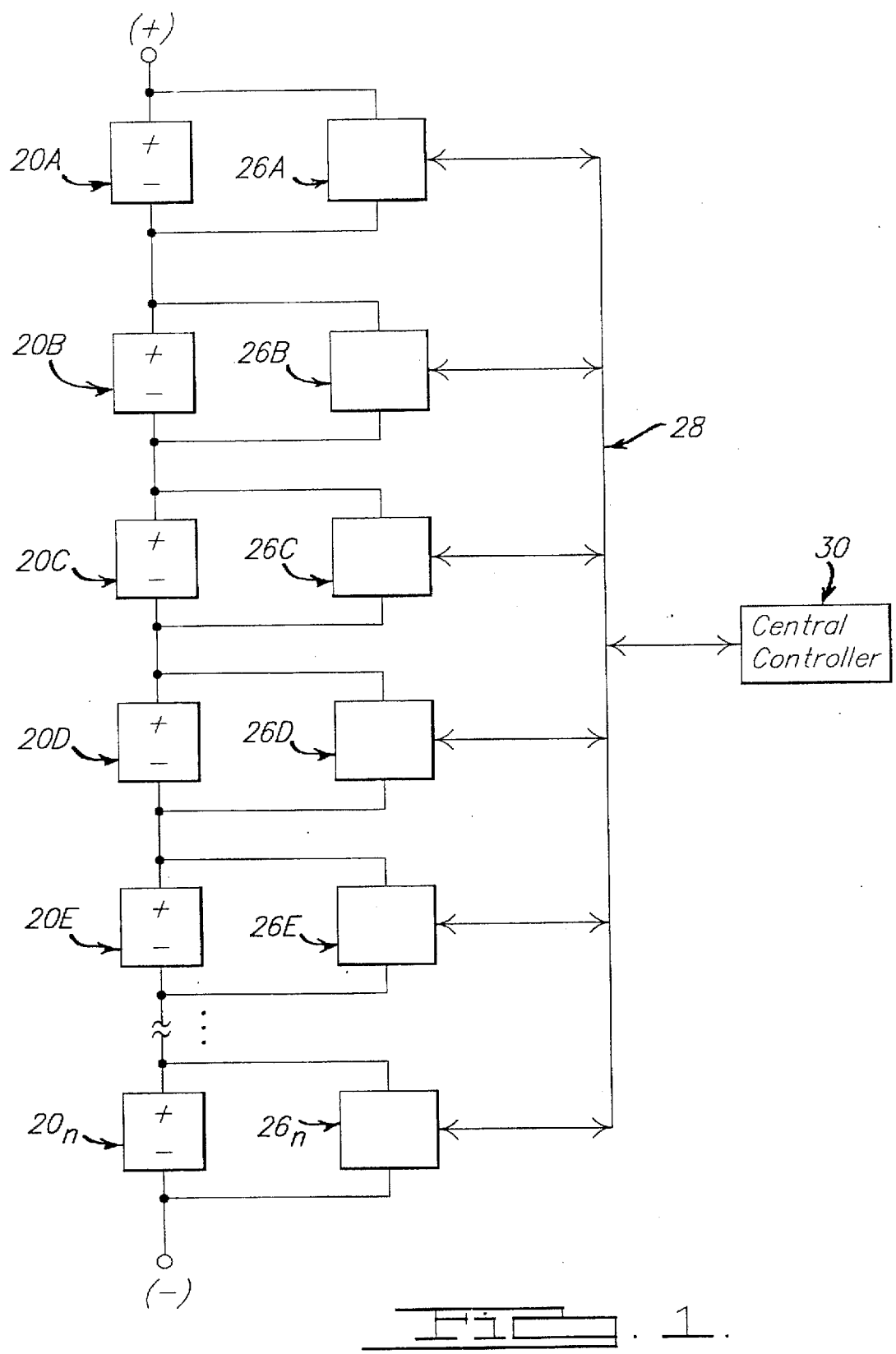
FIG. 1 illustrates a battery pack comprising a plurality of batteries 20, along with associated monitoring components.

Refer first to FIG. 1. FIG. 1 illustrates a system containing a battery pack comprising seriesconnected batteries 20. The battery pack has a positive terminal (+) and a negative terminal (−), these terminals coupled to an electrical load (not shown) which uses the energy stored in batteries 20. It is also through positive terminal (+) and negative terminal (−) that the battery pack is recharged through connection to a recharger (not shown).

Coupled across each battery 20 is a module control unit 26. Module control units 26 are each coupled to a data bus 28, such as the medium-speed serial communications protocol (SCP) bus employed by Ford Motor Company. Other data buses with appropriate bandwidth can be used as well. Also coupled to data bus 28 is a central controller 30. Central controller 30 is preferably a microprocessor-based component with sufficient microcomputer resources (throughput, memory, inputs, outputs, data bus interface and the like) to perform the functions ascribed to it in this disclosure.

Refer now to FIG. 2, where additional detail regarding module control units 26 is provided. Each module control unit 26 is preferably very small and is preferably located within the case of its respective battery 20. Module control unit 26 includes a microprocessor 40, such as the PIC16C71 microprocessor from Microchip Corporation, although any equivalent microprocessor can be used as well. Also included in module control unit 26 is an analog-to-digital (A/D) converter 42.

Further included within module control unit 26 is a voltage regulator 44. Voltage regulator 44 provides a regulated voltage $V_{ref}$ preferably 5 volts DC, for use within module control unit 26. $V_{ref}$ for example, is used as a voltage source for microprocessor 40 and A/D converter 42. Coupled across the respective battery 20 is a voltage divider comprising resistors 46 and 48. The center node 50 of this voltage divider is coupled to A/D converter 42, thus allowing module control unit 26 to measure the terminal voltage of battery 20.

Also included in module control unit 26 is a thermistor 52. Thermistor 52 is provided to measure the temperature of the respective battery 20 to which module control unit 26 is coupled. An appropriate pull-up resistor 54 pulls thermistor 52 up to $V_{ref}$. The center node 56 between thermistor 52 and pull-up resistor 54 is coupled to A/D converter 42.

Module control unit 26 further includes a resistor 60 which is coupled to an output 62 of microprocessor 40. Output 62 of microprocessor 40 is an output which can be pulled LOW in a pulse-width modulated (PWM) manner. The duty cycle at which output 62 is pulled LOW is software-controllable. Thus, for a portion of the period of the signal at output 62, output 62 is HIGH (i.e., about five volts). For the remainder of the period, output 62 is LOW (i.e., about zero volts), causing resistor 60 to be shunted across the terminals of battery 20. In one embodiment of the present invention, resistor 60 has been selected to be 200 ohms. Therefore, at a 100% LOW duty cycle, output 62 of microprocessor 40 draws 25 milliamperes of current (5 volts/200 ohms) from battery 20. For lesser duty cycles, output 62 draws less average current from battery 20.

Module control unit 26 also includes data bus interface circuitry 64 to allow microprocessor 40 to communicate in the appropriate protocol for data bus 28. An optical isolator 66 is also employed to assure commonmode voltage isolation between central controller 30 and batteries 20. The battery pack comprising the series connection of batteries 20 will in the case of a typical electric vehicle have a voltage of several hundred volts between the (+) and (−) terminals.

The system of FIGS. 1 and 2 balances the charge of batteries 20 as will now be described. The method which will be described can be performed continuously, when the batteries are "on charge", being discharged through their intended load (e.g., the electric motor in an electric vehicle) or sitting idle. The method can be called "continuous" in that it can continually work prevent large charge imbalances between batteries 20, rather than relying solely on balancing at the end of charge of batteries 20.

Refer now additionally to FIG. 3 for a description of one embodiment of the algorithm which can be employed in the charge balancing method. At step 100, the temperature of each of batteries 20 is measured. These measurements are done by each module control unit 26, preferably at the command of central controller 30, using the thermistor 52 in each module control unit 26. The temperatures are then reported back to central controller 30. Central controller 30 contains in memory a look-up table which contains the typical self-discharge rate of batteries 20 (in units of current) as a function of temperature. This look-up table is populated using empirical data gathered by measuring battery discharge rates in the laboratory or during vehicle development. Generally, the coolest battery 20 will have the lowest self-discharge rate, with successively warmer batteries having successively higher self-discharge rates.

At step 102, central controller 30 commands each module control unit 26 to shunt an appropriate amount of current through its resistor 60 and microprocessor output 62 in order to equalize the self-discharge rates of batteries 20. The battery 20 with the highest self-discharge rate will not need to shunt any current, while batteries 20 with lower self-discharge rates will need to shunt successively larger amounts of current in order to equalize the self-discharge rates. Steps 100 and 102 are repeatedly performed at a predetermined rate.

The algorithm of FIG. 3 substantially reduces the tendency of the states of charge of batteries 20 to become imbalanced due to differing self-discharge rates between batteries 20. Thus, any imbalance which must be corrected at the end of charging is greatly reduced. (It should be noted that any known method of balancing at the end of charging, such as those mentioned in the Background section of this disclosure, can be applied.) The reduced charge imbalance which must be corrected at the end of charging greatly reduces a number of the disadvantages, discussed in the Background section of this disclosure, involved in prior art methods of balancing at the end of charging. For example, if a large charging current is used until one battery 20 is charged and then a trickle current is used until the remainder of the batteries 20 are charged, this trickle current will only need to be applied for a relatively short time. This is due to the avoidance of large charge imbalances being developed between batteries 20. Thus, large increases in charging time are avoided. Also, if a large charging current is used until one battery 20 is charged and then a smaller current, shunted around any fully-charged batteries 20, is used, the smaller current will again only need to be applied for a relatively short time.

An advantageous feature of the present system and method for charge balancing should also be emphasized here. Recall that shunt resistor 62 is 200 ohms in one embodiment of the present invention. With a maximum of five volts across resistor 62, resistor 62 has a $V^2/R$ power dissipation of only one-eighth watt. One can thus see that the continuous charge balancing method of the present invention does not require high-wattage electronic components. This advantage accrues because the continuous charge balancing prevents large charge imbalances from occurring and requiring balancing in a short period of time.

A second algorithm according to a second embodiment of the present invention is illustrated with reference to FIG. 4. Here, at step 200, the terminal voltage of each battery 20 is measured by its respective module control unit 26, preferably at the simultaneous command of central controller 30. Such a simultaneous command can come via a single "broadcast" message on data bus 28, directed to all module control units 26; each module control unit 26 will immediately measure the terminal voltage of its respective battery 20. The terminal voltages are then reported back to central controller 30 by module control units 26 as arbitration on data bus 28 will allow. Because batteries 20 are connected in series, the same current is drawn from batteries 20 by their intended electrical load (e.g., the electric motor of an electric vehicle) or provided to batteries 20 by their charger. For batteries which have the same current (or no current) drawn from them or supplied to them, the relative terminal voltages of the batteries are an indication of the relative states of charge of the batteries. The batteries with higher terminal voltages will have higher states of charge. Thus, at step 202, central controller 30 commands those module control units 26 connected to batteries 20 with higher voltages to shunt current via their shunt resistors 60 and microprocessor outputs 62. Those batteries 20 with the highest voltages will be directed to shunt more current. The battery 20 with the lowest voltage will not need to shunt any current. This algorithm of FIG. 4 will help continually prevent or reduce charge imbalances which must be eliminated at the end of charging of batteries 20. The algorithm is performed repeatedly at a predetermined rate.

To further enhance the algorithm of FIG. 4, knowledge of the actual current drawn from or supplied to batteries 20 can be supplied by a current sensor in series with batteries 20. Such knowledge of actual current can be used as an aid in determining actual states of charge of batteries 20 or otherwise refining the algorithm of FIG. 4.

The algorithms of FIGS. 3 and 4 can also "learn" over a number of charge/discharge cycles of batteries 20. For example, one or more of batteries 20 may have self-discharge rates which vary from expected nominal values, due to factors such as manufacturing variations. Such differences in self-discharge rates can be learned by observing batteries 20 over a number of charge/discharge cycles, and the charge-balancing algorithms can adaptively recalibrate themselves accordingly.

An alternative algorithm for continuous charge balancing of batteries 20 can combine the approaches illustrated in FIGS. 3 and 4. That is, module control units 26 can be directed to shunt current based on a three-dimensional function having both temperature and voltage of batteries 20 as independent variables and shunt current as the dependent variable.

One might be inclined to question the strategy described in this disclosure of shunting current from some of batteries 20. This may appear to be squandering electrical energy stored in those batteries 20 and may thus appear to be disadvantageous. However, as a practical matter, the battery pack containing batteries 20 cannot supply any further electrical energy after one of batteries 20 is exhausted. Therefore, any excess energy in the other batteries 20 is not usable anyway (at least until the charges of batteries 20 are balanced). One of the advantages of the strategy of continuous charge balancing described in this disclosure is that the magnitude of imbalance is kept small, allowing charging of the batteries (including any necessary rebalancing which occurs at the end of charging) to be done in a relatively short time.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

I claim:

1. A method for balancing charges of a plurality of batteries coupled in series, the method comprising:
    (a) determining actual or estimated rates of self-discharge of the batteries; and
    (b) individually shunting across one or more of the batteries to cause shunt currents which at least partially compensate for differences in said rates of self-discharge between batteries.

2. A method as recited in claim 1, wherein the step of determining actual or estimated rates of self-discharge of the batteries further comprises the step of measuring temperatures of said batteries to estimate said rates of self-discharge.

3. A method as recited in claim 2, further comprising the step of performing said steps (a) and (b) when said batteries are not being charged from an energy source external to said batteries.

4. A method as recited in claim 1, further comprising the step of performing said steps (a) and (b) when said batteries are not being charged from an energy source external to said batteries.

5. A method for balancing charges of a plurality of batteries coupled in series, the method comprising:
  (a) measuring temperatures of the batteries; and
  (b) individually shunting across one or more of the batteries to cause shunt currents from said one or more of the batteries which are functions of the temperatures of said one or more batteries.

6. A method as recited in claim 5, further comprising the step of performing steps (a) and (b) when said batteries are not being charged from an energy source external to said batteries.

7. A method as recited in claim 6, wherein said step of individually shunting across one or more of the batteries to cause shunt currents from said batteries which are functions of the temperatures of the batteries further comprises the step of causing larger shunt currents from warmer batteries.

8. A method for balancing charges of a plurality of batteries coupled in series, said plurality of batteries furnished to store and provide energy for use in operating an electrical device, said method comprising:

(a) determining actual or relative states of charge of said plurality of batteries when said plurality of batteries are providing energy for operating said electrical device; and (b) individually shunting across one or more of said plurality of batteries having relatively higher states of charge than the remainder of said plurality of batteries when said plurality of batteries are providing energy for operating said electrical device, to generate shunt currents from said one or more batteries.

9. A method as recited in claim 8, wherein magnitudes of said shunt currents are functions of the states of charge of the batteries from which the shunt currents are generated.

10. A method as recited in claim 9, wherein said shunt currents are larger from batteries with higher states of charge.

11. A method as recited in claim 10, wherein said step of determining actual or relative states of charge of said plurality of batteries when said plurality of batteries are providing energy for operating said electrical device further comprises measuring terminal voltages of said batteries as indications of relative states of charge of said batteries.

12. A method as recited in claim 8, wherein said step of determining actual or relative states of charge of said plurality of batteries when said plurality of batteries are providing energy for operating said electrical device further comprises measuring terminal voltages of said batteries as indications of relative states of charge of said batteries.

* * * * *